(12) United States Patent
Nagata

(10) Patent No.: US 12,097,870 B2
(45) Date of Patent: Sep. 24, 2024

(54) INTUITIVE TWO-DIMENSIONAL WARNING INDICATOR SYSTEMS AND METHODS

(71) Applicant: TOYOTA MOTOR ENGINEERING & MANUFACTURING NORTH AMERICA, INC., Plano, TX (US)

(72) Inventor: Katsumi Nagata, Foster City, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 121 days.

(21) Appl. No.: 17/939,741

(22) Filed: Sep. 7, 2022

(65) Prior Publication Data

US 2024/0075946 A1    Mar. 7, 2024

(51) Int. Cl.
| | |
|---|---|
| B60W 50/14 | (2020.01) |
| B60K 35/00 | (2024.01) |
| B60K 35/28 | (2024.01) |
| B60K 35/29 | (2024.01) |

(52) U.S. Cl.
CPC ............. *B60W 50/14* (2013.01); *B60K 35/00* (2013.01); *B60K 35/28* (2024.01); *B60K 35/29* (2024.01); *B60K 2360/178* (2024.01); *B60K 2360/1868* (2024.01); *B60K 2360/188* (2024.01); *B60K 2360/332* (2024.01); *B60K 2360/349* (2024.01)

(58) Field of Classification Search
CPC .............. B60K 35/00; B60K 2360/178; B60K 2360/332; B60K 35/28; B60K 2360/1868; B60K 35/29; B60K 2360/349

USPC .......................................................... 340/435
See application file for complete search history.

(56) References Cited

U.S. PATENT DOCUMENTS

| | | | |
|---|---|---|---|
| 7,043,342 B1 * | 5/2006 | Dewees | G02B 27/01 |
| | | | 701/1 |
| 8,294,563 B2 | 10/2012 | Shimoda et al. | |
| 8,384,782 B2 | 2/2013 | Hiroshi | |
| 8,793,053 B2 | 7/2014 | Takashi et al. | |
| 9,221,384 B2 | 12/2015 | Giesler et al. | |
| 9,472,109 B2 | 10/2016 | Starr et al. | |
| 9,802,540 B2 | 10/2017 | Frommann et al. | |

FOREIGN PATENT DOCUMENTS

| | | | |
|---|---|---|---|
| CN | 113246978 A | * | 8/2021 |
| JP | 2004256033 A | * | 9/2004 |
| JP | 2005153675 A | * | 6/2005 |
| JP | 6559464 B2 | | 8/2019 |

* cited by examiner

Primary Examiner — Kam Wan Ma
(74) Attorney, Agent, or Firm — Haynes and Boone, LLP

(57) ABSTRACT

Systems and methods of an intuitive two-dimensional warning indicator are provided. Various embodiments include a warning indicator for mounting on an instrument panel of a vehicle. The warning indicator may include a plurality of illumination bars defining a polygonal shape representing a two-dimensional layout of the vehicle's surroundings. The warning indicator may be configured to illuminate at least one illumination bar of the plurality of illumination bars based on a warning issued by a vehicle system of the vehicle. The driver may be able to see the warning indicator in his/her peripheral vision while looking forward while driving. Associated vehicles including the warning indicator are provided. Associated methods are also provided.

18 Claims, 9 Drawing Sheets

Side View (a-a)

INTUITIVE TWO-DIMENSIONAL WARNING INDICATOR SYSTEMS AND METHODS

TECHNICAL FIELD

The present disclosure relates generally to vehicle systems, and, more particularly, to systems and methods for an intuitive two-dimensional warning indicator.

BACKGROUND

Some vehicular warning systems use audio and visual warnings to alert a driver of a vehicle of potential hazards. However, the visual warnings are often individual warnings located within an instrument cluster and/or head-up display (HUD). Many users have been confused of where one or more warnings are coming from or where to check which warning is issued. Thus, some vehicular warning systems are not intuitive for many drivers, with the visual warnings easily missed. In addition, some vehicular warning systems require drivers to look around (e.g., within the instrument cluster, at the vehicle's surroundings, etc.) to see where a warning is coming from, which can lead to confusion and/or a distracted driving behavior.

Therefore, a need exists in the art for systems and methods that address the above deficiencies, or at least offers an improvement, in the art. For example, a need exists for an intuitive warning indicator that provides information regarding obstacles surrounding a vehicle to users.

BRIEF SUMMARY

Various embodiments of the present disclosure include a vehicle. The vehicle includes one or more vehicle safety systems, an instrument panel, and a warning indicator mounted on the instrument panel. The warning indicator includes a plurality of illumination bars that define a polygonal shape representing a two-dimensional layout of the vehicle's surroundings. The warning indicator is configured to illuminate at least one illumination bar of the plurality of illumination bars based on a warning issued by the one or more vehicle safety systems.

Various embodiments of the present disclosure include a warning indicator for mounting on an instrument panel of a vehicle. The warning indicator includes a plurality of illumination bars defining a polygonal shape representing a two-dimensional layout of the vehicle's surroundings. The warning indicator is configured to illuminate at least one illumination bar of the plurality of illumination bars based on a warning issued by a vehicle system of the vehicle.

Various embodiments of the present disclosure include a method. The method includes illuminating at least one illumination bar of a warning indicator based on a warning issued by one or more vehicle safety systems of a vehicle. The warning indicator is mounted on an instrument panel of the vehicle and includes a plurality of illumination bars that define a polygonal shape representing a two-dimensional layout of the vehicle's surroundings.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
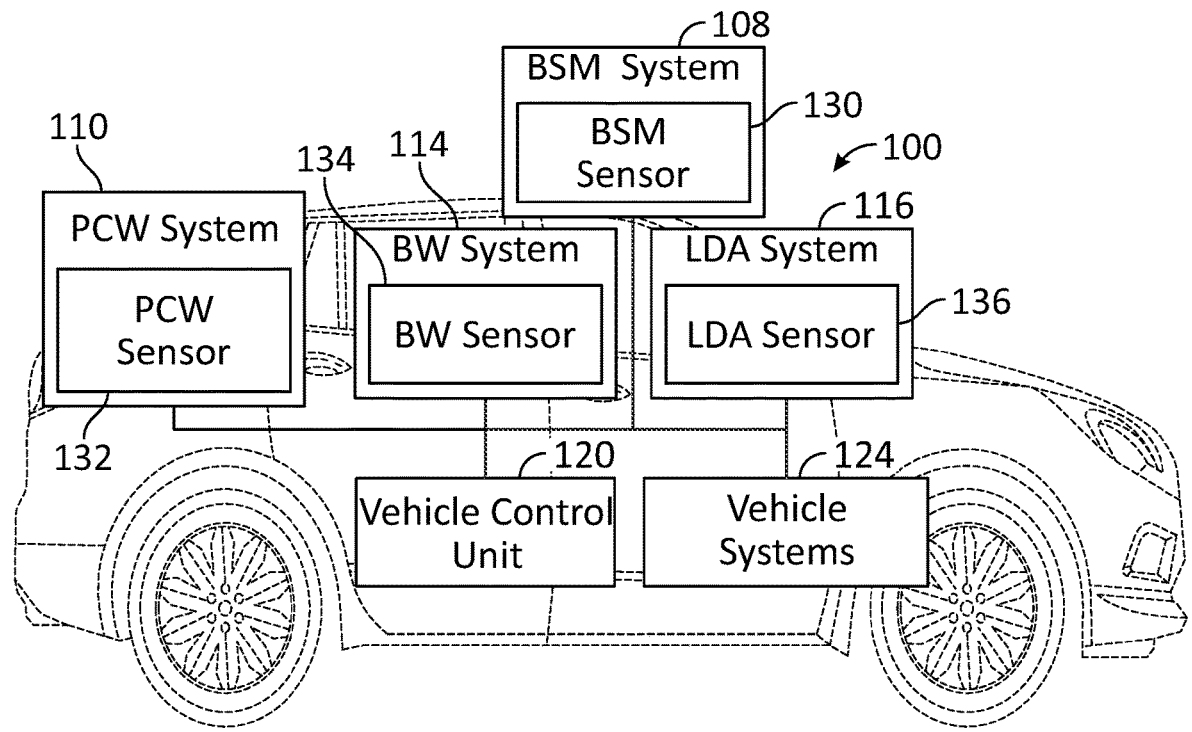
FIG. 1 is a diagram of various systems of a vehicle, according to one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to an intuitive two-dimensional (2D) warning indicator that provides information regarding obstacles surrounding a vehicle to users. The warning indicator may be placed on top of an instrument cluster (IC) or instrument panel (IP), such as within an IC hood, to illuminate light emitting diodes (LEDs) or other lighting devices when there is a warning issued by a vehicle safety system, such as Blind Spot Monitoring, Pre-Collision Warning, Backup Warning, Lane Departure Alert, etc. Due to the location of the warning indicator (e.g., on top of the IC or IP) and the orientation of the warning indicator (e.g., LEDs facing driver), the driver may be able to see the warning indicator in his/her peripheral vision while looking forward while driving. The warning indicator may be positioned within an IC hood, so that the LEDs are visible regardless of weather, time, or direction of sun. In embodiments, the warning indicator may provide a 2D layout of the vehicle's surroundings, with LED bars representing respective sides of the vehicle (e.g., front, back, left, and right).

FIG. 1 is a diagram of various systems of a vehicle 100, according to one or more embodiments of the disclosure.

Referring to FIG. 1, vehicle 100 may include one or more vehicle systems, such as control systems, safety systems, or the like, as detailed more fully below. For example, vehicle 100 may include one or more sensors, one or more vehicle safety systems (e.g., a blind spot monitoring (BSM) system 108, a pre-collision warning (PCW) system 110, a backup warning (BW) system 114, a lane departure alert (LDA) system 116, etc.), a vehicle control unit (VCU) 120, and other vehicle systems 124.

Vehicle 100 is depicted as an SUV in the illustrative embodiment of FIG. 1; however, in other example embodiments, vehicle 100 may be a van, a bus, a sedan, a truck, a utility vehicle (e.g., a SUV, a CUV, etc.) or any other type of vehicle. In embodiments, vehicle 100 is not limited to automobiles, and may include recreational vehicles (RVs), an off-highway vehicle (OHV), a side-by-side vehicle, or a golf cart, among other vehicles.

BSM system 108 is configured to detect objects (e.g., items, vehicles, people, etc.) located in a blind spot of vehicle 100. For example, BSM system 108 may include one or more BSM sensors 130 (e.g., cameras, sonar sensors, radar sensor, lidar sensors, etc.) to scan or otherwise sense an exterior environment of vehicle 100, such as the space just off the rear quarter areas of vehicle 100. BSM system 108 may provide an alert and/or trigger an indicator based on an object positioned within the sensor field, providing a notification to a driver of vehicle 100 of a potential hazard located within the blind spot(s) of vehicle 100. In embodiments, operation of BSM system 108 may be based on a traveling speed of vehicle 100. For instance, BSM may be inoperable when vehicle 100 is traveling under a threshold speed, although other configurations are contemplated.

PCW system 110 is configured to detect objects (e.g., items, vehicles, people, etc.) located in front of vehicle 100, such as during vehicular movement. For example, PCW system 110 may include one or more PCW sensors 132 (e.g., a front-facing camera, a radar, a laser, etc.) to sense and measure a distance between vehicle 100 and an object or obstacle in front of vehicle 100. PCW system 110 may determine if a collision is likely based on the detected distance and a speed of vehicle 100. If a collision is determined likely, PCW system 110 may provide an alert and/or trigger an indicator to notify the driver of the danger. In embodiments, PCW system 110 may intervene to prevent collisions. For instance, PCW system 110 may bring vehicle 100 to a complete stop automatically, if necessary to prevent a front-end collision.

BW system 114 is configured to detect objects (e.g., items, vehicles, people, etc.) located behind vehicle 100, such as when vehicle 100 is in reverse. For instance, BW system 114 may include one or more BW sensors 134 (e.g., cameras, sonar sensors, radar sensor, lidar sensors, etc.) to scan or otherwise sense objects located behind vehicle 100. BW system 114 may provide an alert and/or trigger an indicator based on detection of an object behind vehicle 100. In embodiments, BW system 114 may intervene to prevent collisions. For instance, BW system 114 may bring vehicle 100 to a complete stop automatically, if necessary to prevent backing into an object.

LDA system 116 is configured to determine if vehicle 100 is drifting or departing a lane. For instance, LDA system 116 may include one or more LDA sensors 136 (e.g., cameras, lasers, infrared sensors, GPS sensors, etc.) to detect lane markers or otherwise determine the position of vehicle 100 within a lane. LDA system 116 may provide an alert and/or trigger an indicator based on detection of vehicle 100 contacting the lane markers, drifting, or otherwise departing the lane. In embodiments, LDA system 116 may intervene to limit accidents by taking steps (e.g., automatically) to ensure vehicle 100 stays in its lane. For example, LDA system 116 may include any one of a lane keeping assist system, a lane centering assist system, or an automated lane keeping system, among other systems.

VCU 120 may be any logic device, controller, processor, module, circuitry, or device configured to perform one or more operations. VCU 120, which may be referred to as a logic device, may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of vehicle 100, such as BSM system 108, PCW system 110, BW system 114, LDA system 116, vehicle systems 124, and/or other elements of vehicle 100, for example. Such software instructions may also implement methods for processing images, video, and/or other sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle 100).

VCU 120 may be communicatively connected to BSM system 108, PCW system 110, BW system 114, LDA system 116, and vehicle systems 124. VCU 120 may be configured to receive data from at least one sensor of vehicle 100. For example, VCU 120 may receive data or other sensor signals from sensors 130, 132, 134, 136, or any combination thereof. In embodiments, VCU 120 may receive data from a map, a service, or a network, among other external sources identifying one or more conditions, obstacles, or elements of an off-road trail. Depending on the application, VCU 120 may receive and transmit data over wired or wireless communication.

Based on data received, VCU 120 may be configured to determine a safety condition. For instance, VCU 120 may determine that one or more hazards exist in the environment surrounding vehicle 100 based on data received from BSM system 108, PCW system 110, BW system 114, LDA system 116, or any combination thereof. In embodiments, VCU 120 may apply one or more machine learning and/or artificial intelligence algorithms in determining the safety conditions. As a result, VCU 120 may include one or more smart features to adapt the system where appropriate.

With continued reference to FIG. 1, vehicle 100 may include other components or systems. For example, vehicle systems 124 may include a propulsion system (e.g., engine and drivetrain), a suspension system, a GPS system, a vehicle dynamics system, sensors, interfaces, controllers, control systems, an audio system, a display system, a communications system, and/or a user interface system, among other systems without intent to limit, of vehicle 100.

Figure 2A:
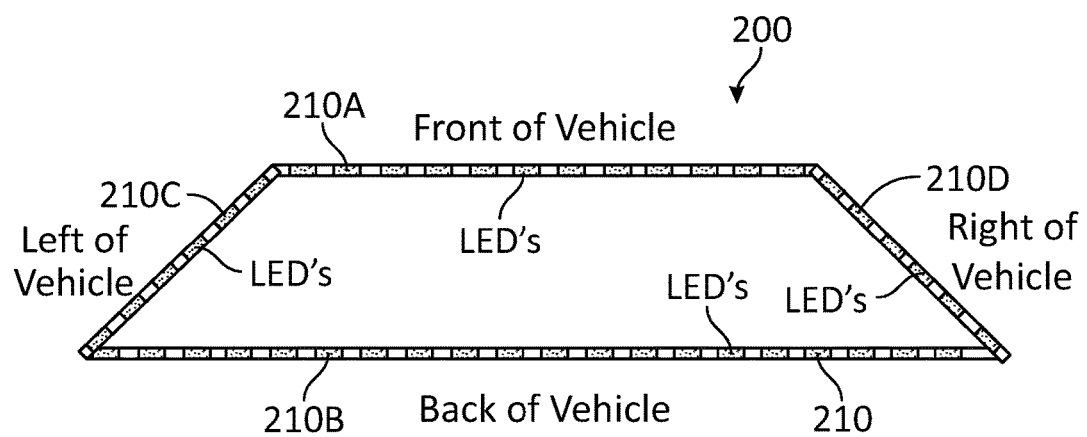
FIG. 2A is a diagram of a top view of a two-dimensional warning indicator, according to one or more embodiments of the disclosure.
Figure 2B:
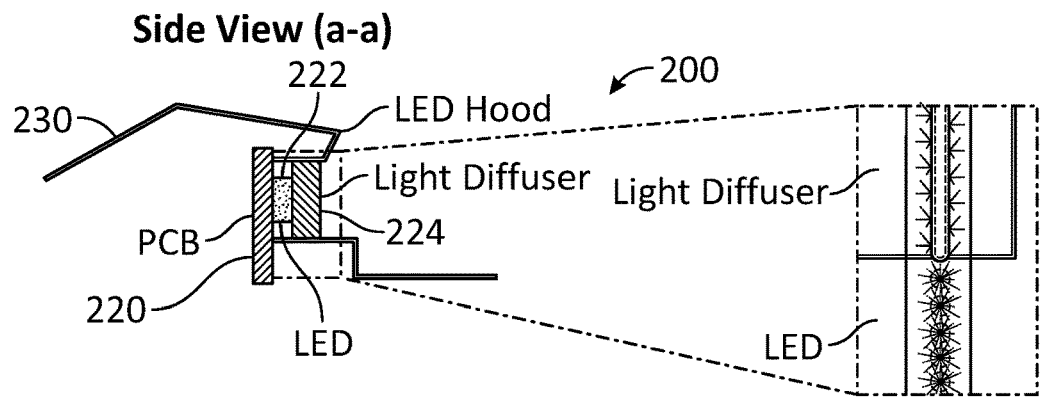
FIG. 2B is a diagram of a side view of the warning indicator, according to one or more embodiments of the disclosure.
Figure 2C:
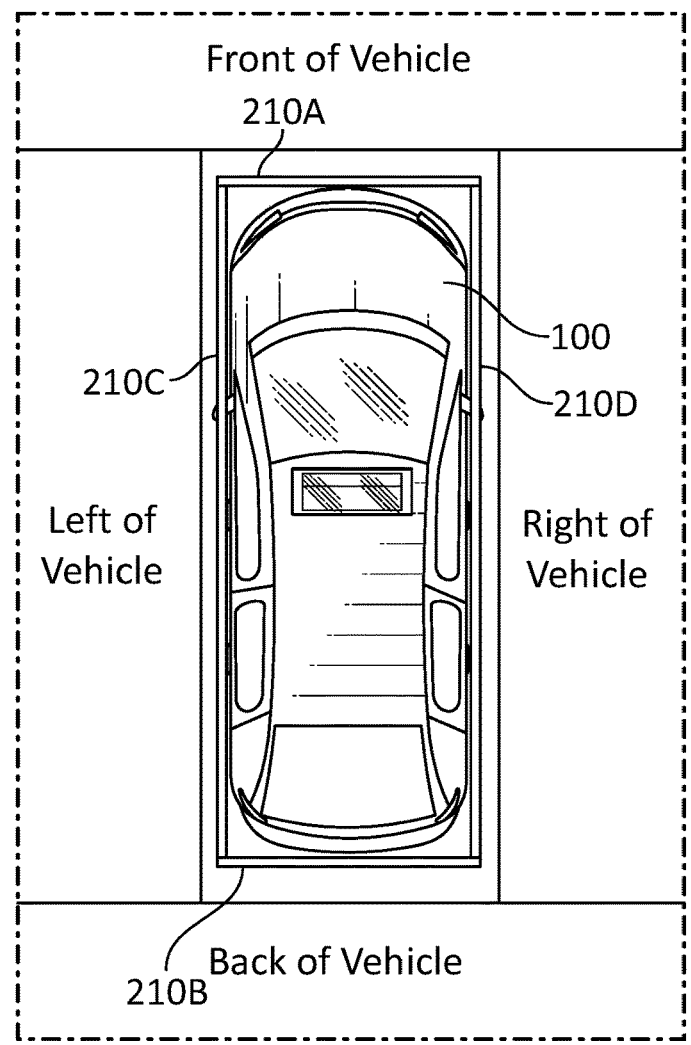
FIG. 2C is a diagram of a top view of a vehicle and the vehicle's surroundings, according to one or more embodiments of the disclosure.

FIGS. 2A-2C illustrate a 2D warning indicator 200 associated with vehicle 100, according to one or more embodiments of the disclosure. FIG. 2A is an example diagram of a top view of warning indicator 200, according to one or more embodiments of the disclosure. FIG. 2B is an example diagram of a side view of warning indicator 200, according to one or more embodiments of the disclosure. FIG. 2C is an example diagram of a top view of an illustrative vehicle (e.g., vehicle 100) and the vehicle's surroundings, according to one or more embodiments of the disclosure. Warning indicator 200 illuminates one or more light emitting diodes (LEDs) or other lighting devices based on warnings issued by a vehicle safety system (e.g., BSM system 108, PCW system 110, BW system 114, and/or LDA system 116). Warning indicator 200 may provide an intuitive indication of the warning, such as providing information regarding the type of warning as well as a position of an associated hazard triggering the warning. For example, warning indicator 200 may provide a 2D layout of vehicle 100, with portions of warning indicator 200 representing different sides or portions of vehicle 100 (e.g., front, back, left, and right), as detailed below.

Referring to FIGS. 2A and 2C, warning indicator 200 may include a plurality of illumination bars 210 (e.g., four illumination bars 210, less than four illumination bars 210, more than four illumination bars 210) that define a polygonal shape representing a 2D layout of the surroundings of vehicle 100. For example, each illumination bar 210 may represent a side of vehicle 100, such as a front illumination bar 210A representing a front side of vehicle 100, a back illumination bar 210B representing a back side of vehicle 100, a left illumination bar 210C representing a left side of vehicle 100, and a right illumination bar 210D representing a right side of vehicle 100. As shown in FIG. 2A, front, back, left, and right illumination bars 210A, 210B, 210C, 210D define a trapezoidal shape of warning indicator 200. Such configurations are illustrative only, and warning indicator 200 may include any number of illumination bars 210 arranged in different shapes and configurations.

As described herein, warning indicator 200 is configured to illuminate at least one segment of illumination bar 210 based on a warning issued by one or more vehicle safety systems (e.g., BSM system 108, PCW system 110, BW system 114, LDA system 116, etc.). For example, warning indicator 200 may provide information regarding obstacles surrounding vehicle 100 through selective illumination of at least one illumination bar 210. More particularly, warning indicator 200 may provide a first warning illumination based on a first warning issued by a first vehicle safety system (e.g., BSM system 108), a second warning illumination based on a second warning issued by a second vehicle safety system (e.g., PCW system 110), a third warning illumination based on a third warning issued by a third vehicle safety system (e.g., BW system 114), and so on, as described more fully below.

In embodiments, the warning illuminations provided by warning indicator 200 may be color-based, pattern-based, and/or based on illumination brightness. For instance, warning indicator 200 may illuminate a first color, a first pattern, and/or a first brightness of illumination intensity based on the first warning issued by the first vehicle safety system, a second color, a second pattern, and/or a second brightness of illumination intensity based on the second warning issued by the second vehicle safety system, a third color, a third pattern, and/or a third brightness of illumination intensity based on the third warning issued by the third vehicle safety system, and so on.

In embodiments, the color, pattern, or brightness of the warning illuminations may be based on the detected hazard. For instance, warning indicator 200 may show a "warning" state with red, a "caution" state with orange, and a "general notification" state with green, although other configurations are contemplated to distinguish between hazard degrees. In embodiments, the driver or another user may assign particular colors to specific functions or vehicle systems (e.g., a first color for a first vehicle safety system, a second color for a second vehicle safety system, etc.), or the colors may be preset from the factory, to identify warnings based on color. In another embodiments, the warning illustrations provided by warning indicator 200 may be based on an illuminated pattern and/or brightness of illumination intensity. For example, a particular set of LEDs may blink in particular sequences or brightness of illumination intensity could be shown differently based on warning issued by the vehicle safety system.

Warning indicator 200 may include many configurations to facilitate visibility of warning indicator 200 by a driver of vehicle 100. For example, referring to FIG. 2B, warning indicator 200 may include a control board (e.g., PCB 220), a light emitting diode (LED) 222, and a light diffuser 224, with LED 222 and light diffuser 224 facing the driver. As shown, a hood 230 may be positioned on top of the LED 222 and/or light diffuser 224 (e.g., to shield the light diffuser 224 from direct sunlight), such that light from LED 222 is visible to driver regardless of weather, time, or direction of sun. In embodiments, warning indicator 200 may include a dimming function to reduce brightness under low light conditions.

FIGS. 3A-5B illustrate various example applications of warning indicator 200. As shown, vehicle 100 includes an instrument panel 300, with warning indicator 200 mounted on instrument panel 300. For example, warning indicator 200 may be provided on top of instrument panel 300, such as above the gauges of instrument panel 300. Such configurations may position warning indicator 200 within the driver's peripheral vision while driver is looking forward. In this manner, warning indicator 200 may be positioned to limit visual searching for warning indicator 200 by the driver, such as to limit distractions when driving.

Figure 3A:
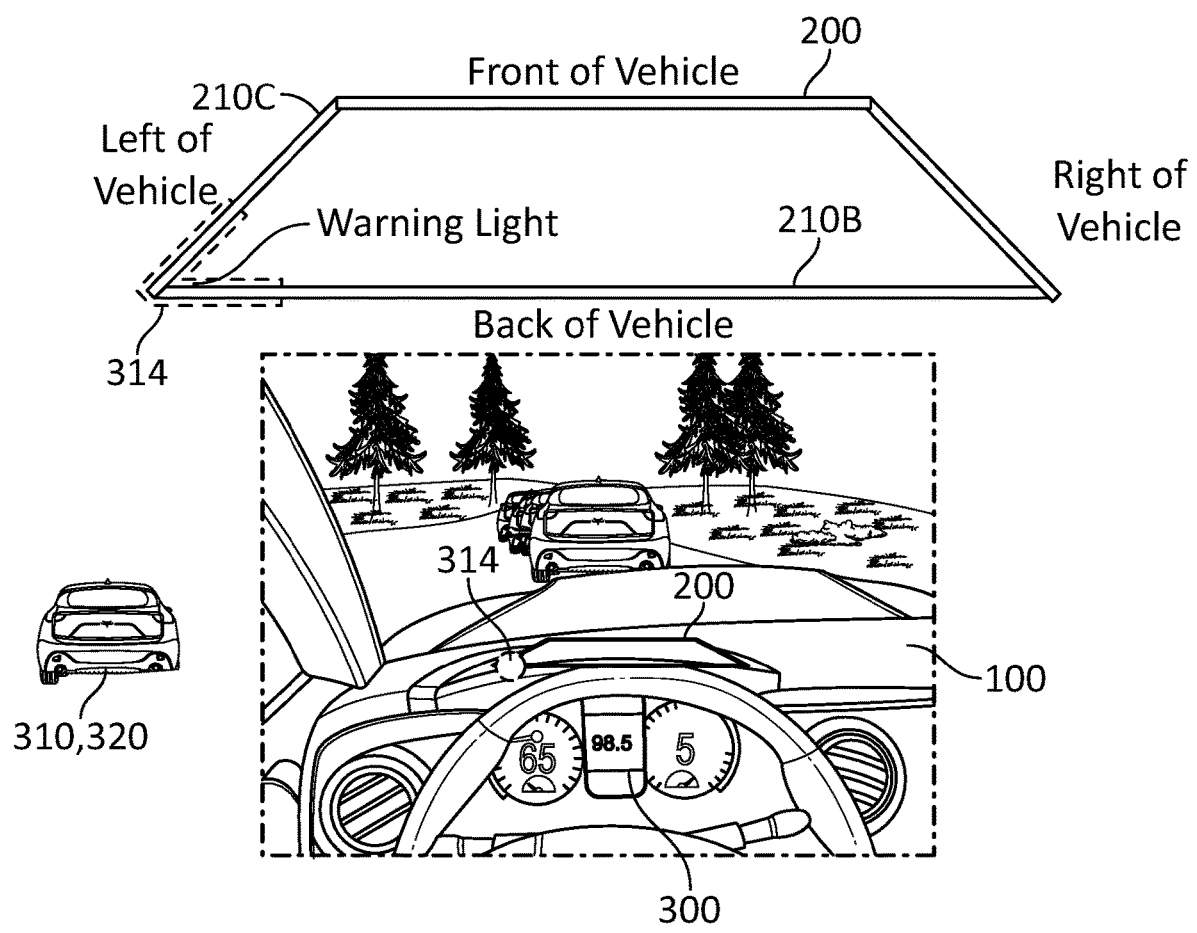
FIG. 3A is a diagram of the warning indicator providing a first warning illumination, according to one or more embodiments of the disclosure.
Figure 3B:
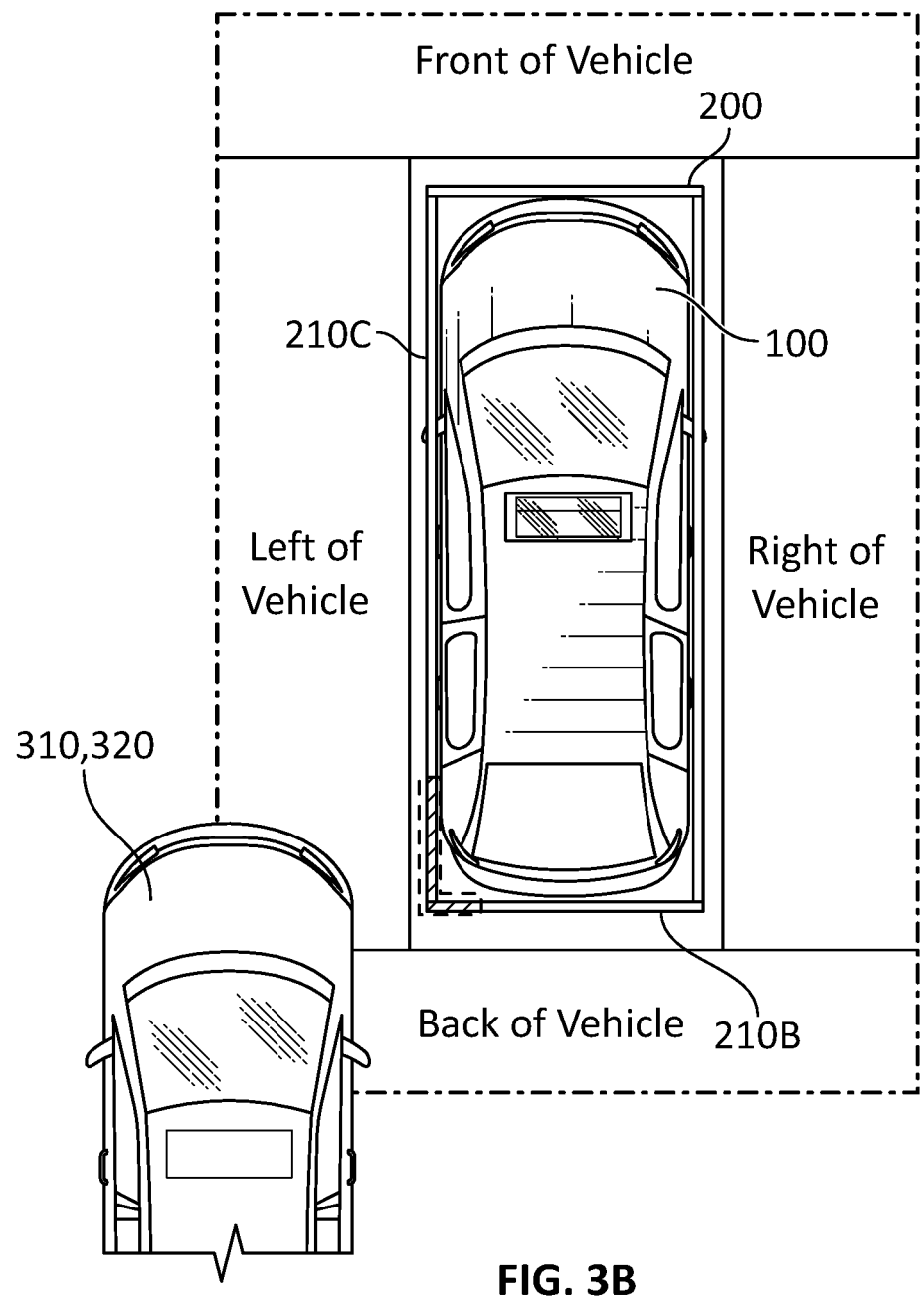
FIG. 3B is a diagram of the vehicle and illustrating a first obstacle necessitating the first warning illumination, according to one or more embodiments of the disclosure.

FIG. 3A is a diagram of warning indicator 200 providing a first warning illumination, according to one or more embodiments of the disclosure. FIG. 3B is a diagram of vehicle 100 and illustrating a first obstacle 310 necessitating the first warning illumination, according to one or more embodiments of the disclosure. Referring to FIGS. 3A-3B, warning indicator 200 may illuminate one or more segment of illumination bars 210 to provide a first warning light 314 based on a warning issued by BSM system 108. For example, upon detection of first obstacle 310 (e.g., a second vehicle 320) in a blind spot of vehicle 100 (e.g., at the driver rear quarter area of vehicle 100) by BSM system 108, a portion of warning indicator 200 may be illuminated indicating the location of second vehicle 320. For instance, first warning light 314 may span the corner between back illumination bar 210B and left illumination bar 210C to indicate the presence of second vehicle 320 at a corresponding corner of vehicle 100. As shown in FIG. 3B, back illumination bar 210B and left illumination bar 210C may be illuminated commensurate with the location of second vehicle 320 relative to vehicle 100 to provide additional positioning information of second vehicle 320 to the driver (e.g., the relative position of second vehicle 320 along the side and/or back of vehicle 100).

Figure 4A:
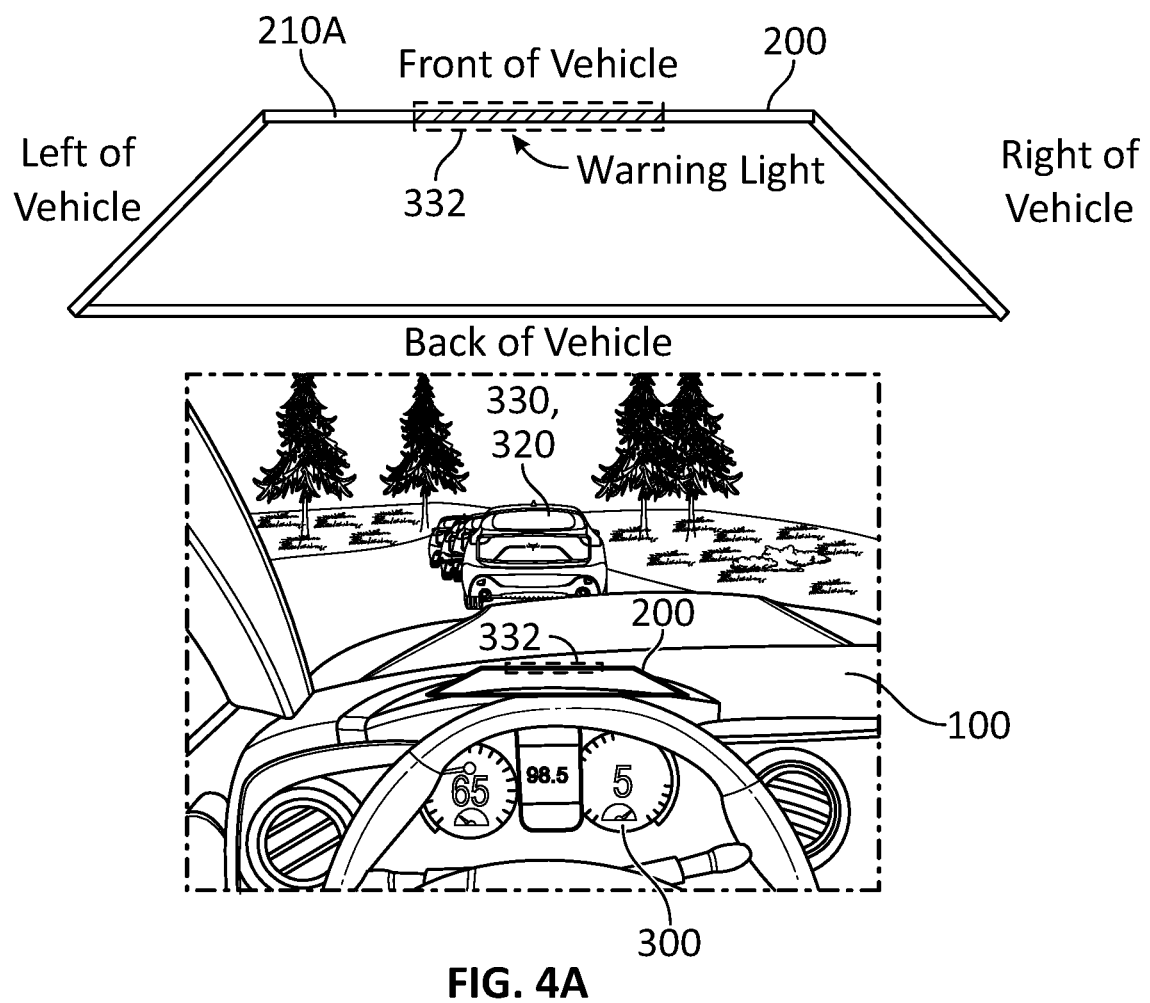
FIG. 4A is a diagram of the warning indicator providing a second warning illumination, according to one or more embodiments of the disclosure.
Figure 4B:
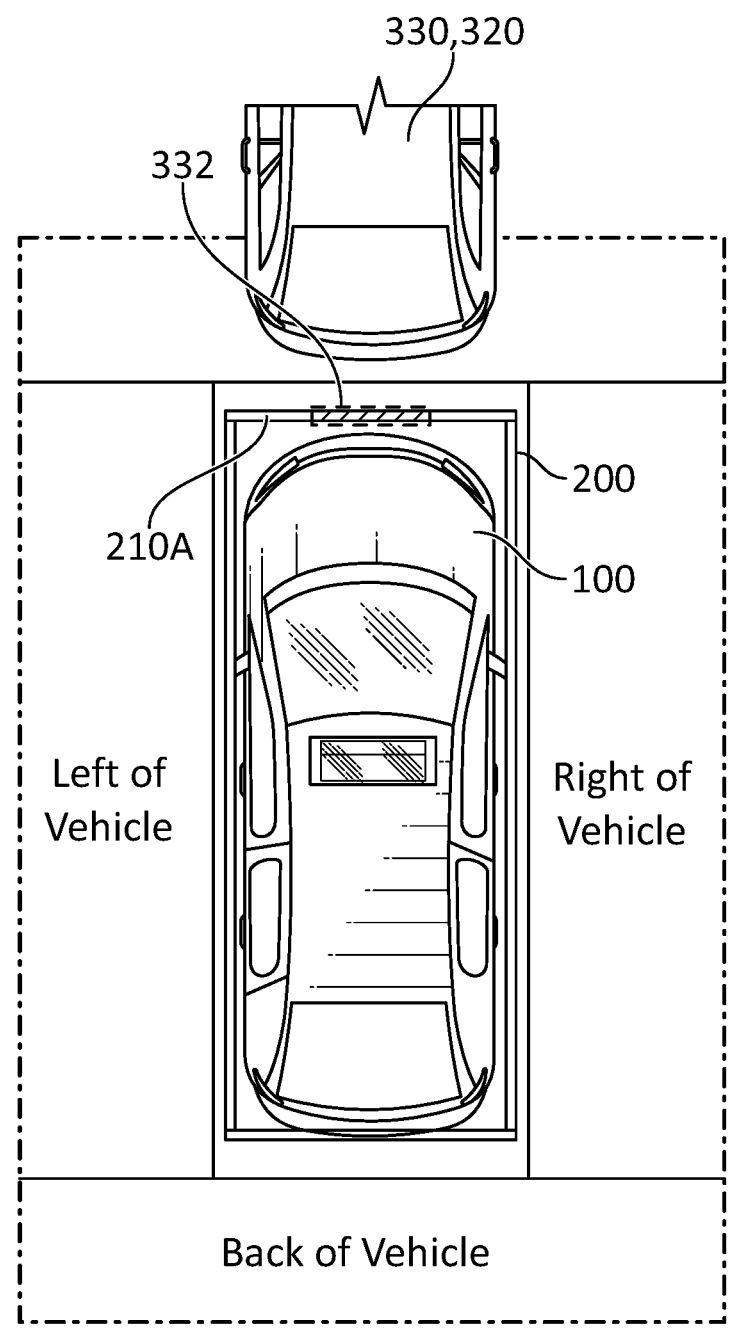
FIG. 4B is a diagram of the vehicle and illustrating a second obstacle necessitating the second warning illumination, according to one or more embodiments of the disclosure.

FIG. 4A is a diagram of warning indicator 200 providing a second warning illumination, according to one or more embodiments of the disclosure. FIG. 4B is a diagram of vehicle 100 and illustrating a second obstacle 330 necessitating the second warning illumination, according to one or more embodiments of the disclosure. Referring to FIGS. 4A-4B, warning indicator 200 may illuminate one or more segment of illumination bars 210 to provide a second warning light 332 based on a warning issued by PCW system 110. For instance, upon detection of a potential front-end collision with second obstacle 330 (e.g., second vehicle 320) by PCW system 110, front illumination bar 210A may be illuminated. In embodiments, second warning light 332 may indicate a position of second obstacle 330 relative to vehicle 100. For example, front illumination bar 210A may be partly illuminated based on the relative location of second obstacle 330, such as second warning light 332 centered along front illumination bar 210A when second obstacle 330 is directly in front of vehicle 100, or second warning light 332 off-centered along front illumination bar 210A when second obstacle 330 is off-set from vehicle 100 (e.g., off-centered left for left off-set positions, off-centered right for right off-set positions, etc.). In embodiments, the entire front illumination bar 210A may be illuminated based on a warning issued by PCW system 110.

Figure 5A:
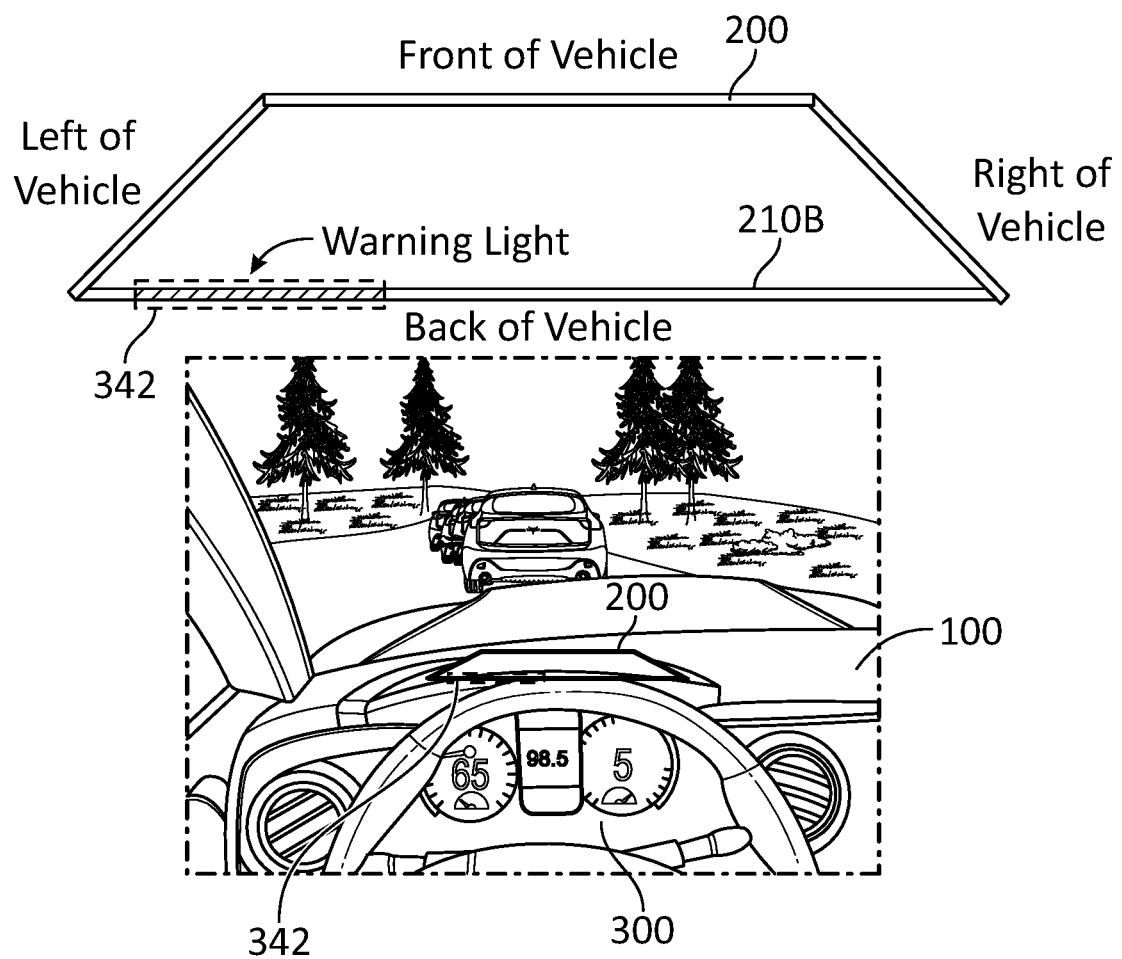
FIG. 5A is a diagram of the warning indicator providing a third warning illumination, according to one or more embodiments of the disclosure.
Figure 5B:
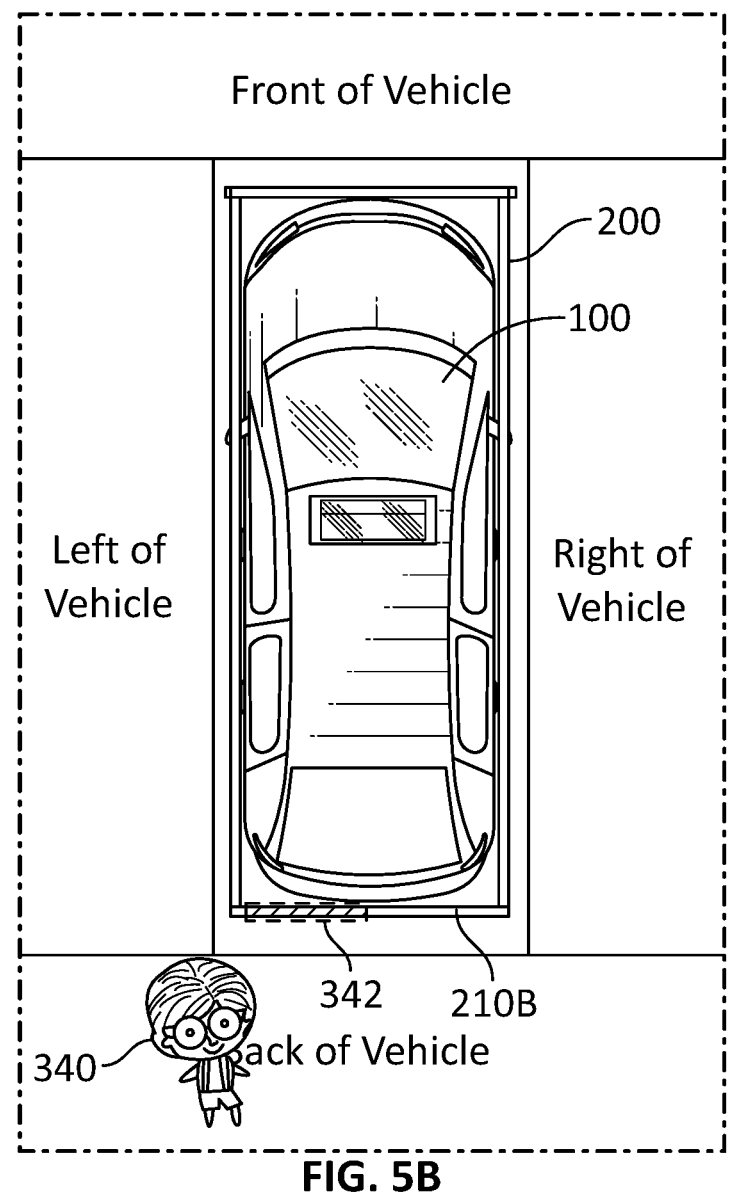
FIG. 5B is a diagram of the vehicle and illustrating a third obstacle necessitating the third warning illumination, according to one or more embodiments of the disclosure.

FIG. 5A is a diagram of warning indicator 200 providing a third warning illumination, according to one or more embodiments of the disclosure. FIG. 5B is a diagram of vehicle 100 and illustrating a third obstacle 340 necessitating the third warning illumination, according to one or more embodiments of the disclosure. Referring to FIGS. 5A-5B, warning indicator 200 may illuminate one or more illumination bars 210 to provide a third warning light 342 based on a warning issued by BW system 114. For example, upon detection of third obstacle 340 (e.g., a pedestrian, objects, second vehicle 320, etc.) behind vehicle 100 by BW system 114, back illumination bar 210B may be illuminated. Similar to second warning light 332, third warning light 342 may indicate a position of third obstacle 340 relative to vehicle 100. For example, back illumination bar 210B may be partly illuminated based on the relative location of third obstacle 340, such as third warning light 342 off-centered along back illumination bar 210B when third obstacle 340 is off-set from vehicle 100 (e.g., off-centered left for left off-set positions, off-centered right for right off-set positions, etc.), or third warning light 342 centered along back illumination bar 210B when third obstacle 340 is centered behind vehicle 100. In embodiments, the entire back illumination bar 210B may be illuminated based on a warning issued by BW system 114.

Figure 6:
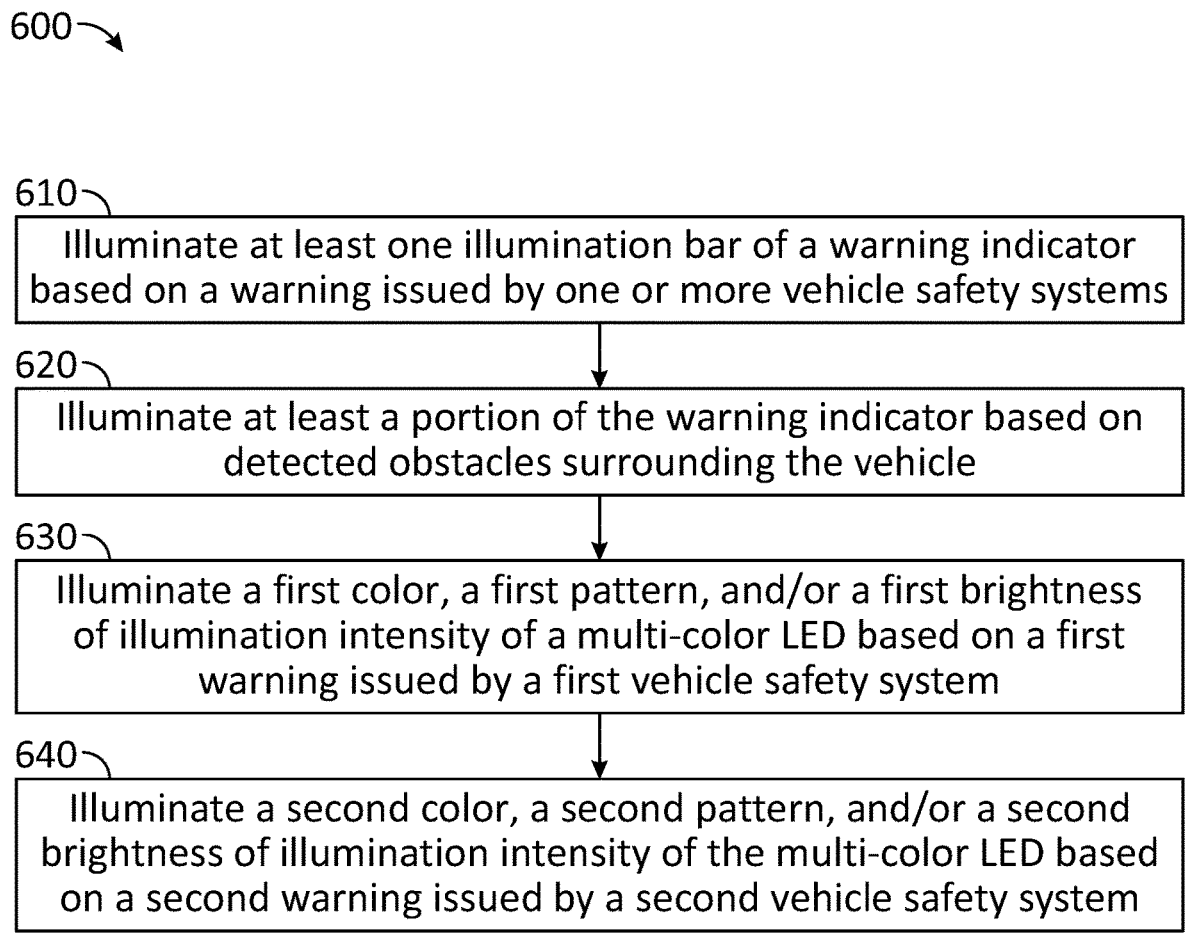
FIG. 6 is a flowchart of a method of illuminating a warning indicator of a vehicle, according to one or more embodiments of the disclosure.

FIG. 6 is a flowchart of a method 600 of illuminating a warning indicator of a vehicle (e.g., warning indicator 200), according to one or more embodiments of the disclosure. For explanatory purposes, method 600 is described herein with reference to FIGS. 1-5B, although method 600 is not limited to the embodiments illustrated in FIGS. 1-5B. Note that one or more operations in FIG. 6 may be combined, omitted, and/or performed in a different order, as desired.

In block 610, method 600 includes illuminating at least one illumination bar of a warning indicator based on a warning issued by one or more vehicle safety systems. The warning indicator may be similar to warning indicator 200, described above. For instance, the warning indicator may be mounted on an instrument panel of the vehicle and include a plurality of illumination or LED bars that define a polygonal shape representing a 2D layout of the vehicle's surroundings. In embodiments, the warning indicator may include a front illumination bar, a back illumination bar, a left illumination bar, and a right illumination bar. The front, back, left, and right illumination bars may represent the front, back, left, and right sides of the vehicle, respectively. In embodiments, the front, back, left, and right illumination bars may define a trapezoidal shape of the warning indicator, such as illustrated in FIG. 2A, described above.

In embodiments, block 610 may include illuminating adjacent illumination bars of the warning indicator based on a detected obstacle at a corner of the vehicle. For example, a corner of the warning indicator may be illuminated based on the detected obstacle or hazard at a corresponding corner of the vehicle.

In block 620, method 600 includes illuminating at least a portion of the warning indicator based on detected obstacles surrounding the vehicle. For example, a portion of the warning indicator may be illuminated based on a detected obstacle by BSM system 108, PCW system 110, BW system 114, or any combination thereof, as described above.

In block 630, method 600 includes illuminating a first color, a first pattern, and/or a first brightness of illumination intensity of an LED based on a first warning issued by a first vehicle safety system. For instance, the warning indicator (or at least a portion of the warning indicator) may illuminate orange (or a different color) based on a warning issued by BSM system 108. Additionally, or alternatively, the warning indicator may illuminate according to a particular pattern and/or brightness associated with the first vehicle safety system (e.g., the BSM system 108).

In block 640, method 600 includes illuminating a second color, a second pattern, and/or a second brightness of illumination intensity of the LED based on a second warning issued by a second vehicle safety system. For example, the warning indicator (or at least a portion of the warning indicator) may illuminate white (or a different color) based on a warning issued by PCW system 110. Additionally, or alternatively, the warning indicator may illuminate according to a particular pattern and/or brightness associated with the second vehicle safety system (e.g., the PCW system 110).

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A vehicle comprising:
   one or more vehicle safety systems;
   an instrument panel; and
   a warning indicator mounted within a hood of the instrument panel, the warning indicator comprising:
      a plurality of illumination bars that define a polygonal shape representing a two-dimensional layout of the vehicle's surroundings, and
      the warning indicator configured to illuminate at least one illumination bar of the plurality of illumination bars based on a warning issued by the one or more vehicle safety systems,
      the warning indicator being positioned within a peripheral vision of a driver while the driver is looking forward.

2. The vehicle of claim 1, wherein each illumination bar of the plurality of illumination bars represents a side of the vehicle.

3. The vehicle of claim 2, wherein:
   the plurality of illumination bars comprises:
      a front illumination bar representing a front side of the vehicle,
      a back illumination bar representing a back side of the vehicle,
      a left illumination bar representing a left side of the vehicle, and
      a right illumination bar representing a right side of the vehicle; and
   the front, back, left, and right illumination bars define a trapezoidal shape of the warning indicator.

4. The vehicle of claim 1, wherein the warning indicator provides information regarding obstacles surrounding the vehicle through selective illumination of at least one illumination bar of the plurality of illumination bars.

5. The vehicle of claim 1, wherein the warning indicator comprises:
   a light diffuser;
   wherein the hood is on top of the light diffuser to shield the light diffuser from direct sunlight.

6. The vehicle of claim 1, wherein the warning indicator comprises a light emitting diode (LED) configured to illuminate a first color, a first pattern, and/or a first brightness of illumination intensity based on a first warning issued by a first vehicle safety system, and a second color, a second pattern, and/or a second brightness of illumination intensity based on a second warning issued by a second vehicle safety system.

7. A warning indicator for mounting on an instrument panel of a vehicle, the warning indicator comprising:
   a plurality of illumination bars defining a polygonal shape representing a two-dimensional layout of the vehicle's surroundings; and
   the warning indicator configured to illuminate at least one illumination bar of the plurality of illumination bars based on a warning issued by a vehicle system of the vehicle,
   the warning indicator being positioned on a hood of the instrument panel within a peripheral vision of a driver while the driver is looking forward.

8. The warning indicator of claim 7, wherein each illumination bar of the plurality of illumination bars represents a side of the vehicle.

9. The warning indicator of claim 8, wherein:
   the plurality of illumination bars comprises:
      a front illumination bar representing a front side of the vehicle,
      a back illumination bar representing a back side of the vehicle,
      a left illumination bar representing a left side of the vehicle, and
      a right illumination bar representing a right side of the vehicle; and
   the front, back, left, and right illumination bars define a trapezoidal shape of the warning indicator.

10. A vehicle comprising the warning indicator of claim 9.

11. The warning indicator of claim 7, wherein the warning indicator provides information regarding obstacles surrounding the vehicle through selective illumination of at least one illumination bar of the plurality of illumination bars.

12. The warning indicator of claim 7, further comprising:
   a light diffuser; and
   a hood on top of the light diffuser to shield the light diffuser from direct sunlight.

13. The warning indicator of claim 7, further comprising a light emitting diode (LED) configured to illuminate a first color, a first pattern, and/or a first brightness of illumination intensity based on a first warning issued by a first vehicle safety system, and a second color, a second pattern, and/or a second brightness of illumination intensity based on a second warning issued by a second vehicle safety system.

14. A method comprising:
   illuminating at least one of a plurality of illumination bars of a warning indicator based on a warning issued by one or more vehicle safety systems of a vehicle,
   wherein the warning indicator is mounted on an instrument panel of the vehicle and comprises the plurality of illumination bars that define a polygonal shape representing a two-dimensional layout of the vehicle's surroundings,
   the warning indicator being positioned on a hood of the instrument panel within a peripheral vision of a driver while the driver is looking forward.

15. The method of claim 14, further comprising illuminating at least a portion of the warning indicator based on detected obstacles surrounding the vehicle.

16. The method of claim 15, wherein the illuminating at least a portion of the warning indicator comprises illuminating adjacent illumination bars of the warning indicator based on a detected obstacle at a corner of the vehicle.

17. The method of claim 14, further comprising:
   illuminating a first color, a first pattern, and/or a first brightness of illumination intensity of a light emitting diode (LED) based on a first warning issued by a first vehicle safety system; and illuminating a second color, a second pattern, and/or a second brightness of illumination intensity of the LED based on a second warning issued by a second vehicle safety system, wherein the plurality of illumination bars comprise the LED.

18. The method of claim 17, wherein:

the warning indicator comprises:
- a front illumination bar representing a front side of the vehicle,
- a back illumination bar representing a back side of the vehicle,
- a left illumination bar representing a left side of the vehicle, and
- a right illumination bar representing a right side of the vehicle; and the front, back, left, and right illumination bars define a trapezoidal shape of the warning indicator, wherein the plurality of illumination bars comprise the front, back, left and right illumination bars.

* * * * *